United States Patent
Colarelli et al.

(10) Patent No.: US 6,178,358 B1
(45) Date of Patent: Jan. 23, 2001

(54) THREE-DIMENSIONAL VIRTUAL VIEW WHEEL ALIGNMENT DISPLAY SYSTEM

(75) Inventors: Nicholas J. Colarelli, Creve Coeur; Timothy A. Larson, Ferguson, both of MO (US)

(73) Assignee: Hunter Engineering Company, Bridgeton, MO (US)

(*) Notice: Under 35 U.S.C. 154(b), the term of this patent shall be extended for 0 days.

(21) Appl. No.: 09/182,100

(22) Filed: Oct. 27, 1998

(51) Int. Cl.$^7$ .................................................. G05B 19/72
(52) U.S. Cl. ................................ 700/16; 700/17; 700/279
(58) Field of Search ........................... 33/203.18, 203.19, 33/203.2; 356/155, 139.09, 152.1, 152.2, 153.3; 702/150; 710/17, 16, 279

(56) References Cited

U.S. PATENT DOCUMENTS

| | | | |
|---|---|---|---|
| 4,180,915 | * | 1/1980 | Lill et al. .................................. 33/228 |
| 4,835,714 | * | 5/1989 | Sano et al. ........................... 364/528.14 |
| 5,532,816 | * | 7/1996 | Spann et al. ........................ 356/139.09 |
| 5,535,522 | | 7/1996 | Jackson . |
| 5,586,062 | * | 12/1996 | Colarelli, III ........................... 364/559 |
| 5,592,383 | * | 1/1997 | Rogers et al. .................... 364/424.034 |
| 5,622,170 | * | 4/1997 | Schulz .................................... 128/653.1 |
| 5,659,493 | * | 8/1997 | Kiridena et al. .................... 395/500.23 |
| 5,724,128 | * | 3/1998 | January .............................. 356/139.09 |
| 5,724,743 | | 3/1998 | Jackson . |
| 5,748,301 | * | 5/1998 | Muller et al. ........................... 356/155 |
| 5,909,380 | * | 6/1999 | Dubois et al. ........................... 351/205 |
| 5,943,783 | * | 8/1999 | Jackson .................................... 33/288 |
| 5,948,024 | * | 9/1999 | O'Mahony et al. ...................... 701/29 |

FOREIGN PATENT DOCUMENTS

2948573 * 6/1981 (DE) ........................................ 33/288

WO 97/14134 10/1996 (WO) .

OTHER PUBLICATIONS

Beissbarth GMBH, ",", Microline 4600 wheel–alignment computer, (Jan. 4, 1994).

John Bean Co., Visualiner 3D—A Quantum Leap in Wheel Alignment Technology (c. 1997).

* cited by examiner

*Primary Examiner*—Bernard Roskoski
*Assistant Examiner*—Maria Fernandez
(74) *Attorney, Agent, or Firm*—Polster, Lieder, Woodruff & Lucchesi, L.C.

(57) ABSTRACT

A three-dimensional wheel alignment display system (10) and method includes a processor (12) and display unit (14) interconnected with a motor vehicle wheel alignment system (18) adapted to determine vehicle wheel angular relationships such as camber, caster, and toe. The processor of the display system is configured to manipulate portions of a digital three-dimensional model (100) of at least one motor vehicle wheel and associated suspension components to correspond to the angular relationships determined by the wheel alignment system. The processor is further configured to interactively display a perspective image (102) of the digital three-dimensional model on a display screen (16), to continually update the perspective image as signals are received from the associated wheel alignment system representative of alterations to the angular relationships made by a technician, and to smoothly alter the interactive display of the perspective image to focus on a particular angular relationship of interest, or to view the overall wheel and suspension layout of the motor vehicle, response to user input commands.

36 Claims, 9 Drawing Sheets

US 6,178,358 B1

THREE-DIMENSIONAL VIRTUAL VIEW WHEEL ALIGNMENT DISPLAY SYSTEM

CROSS-REFERENCE TO RELATED APPLICATIONS

None.

STATEMENT REGARDING FEDERALLY SPONSORED RESEARCH OR DEVELOPMENT

Not applicable.

BACKGROUND OF THE INVENTION

This invention relates to a method and apparatus for determining the alignment of motor vehicle components, and more particularly, to a method and apparatus for displaying a three-dimensional model representing the motor vehicle wheels undergoing alignment, together with information indicia corresponding to actual alignment orientations of the motor vehicle wheels relative to the vehicle chassis as determined by alignment equipment.

Various different display methods and devices have been utilized to aid automotive technicians in determining the alignment and angular relationships of motor vehicle wheels on a vehicle undergoing service relative to the vehicle chassis. When alignment testing equipment was first introduced, the equipment merely provided the technician with a single number, indicative, for a single motor vehicle wheel, of the number of degrees the wheel was out-of-alignment with respect to a predetermined reference plane. This number might be either positive or negative, corresponding to the direction in which the wheel was currently aligned. These types of displays were often not dynamic, in that that technician would be required to make some adjustments to the vehicle alignment, and then re-test the vehicle alignment to determine the results of his adjustments. Eventually, equipment was introduced with the capacity to continually update the display to provide the technician with real-time information corresponding to the effects of any adjustments made to the vehicle alignment.

Alternative methods of displaying the information obtained from wheel alignment testing equipment were developed to provide the technician with additional information. For example, with the advent of computerized testing equipment, two-dimensional bar-graph displays were developed to provide the technician with a visual indication of when a motor vehicle wheel was outside of acceptable tolerance limits for alignment relative to the vehicle chassis. These displays provide the technician with an indicator mark corresponding to the current alignment or angular relationship of the motor vehicle wheel, displayed against a bar-graph representing in-tolerance and out-of-tolerance alignment measurements. As the technician adjusts the wheel alignment, the indicator mark shifts correspondingly, and may be observed in relation to the in- and out-of tolerance positions, providing the technician with a visual indication of wheel alignment.

However, despite the significant advantages over the simple numeric displays offered by the two-dimension bar-graph display, the display system fails to provide the operator with an intuitive representation of which angular relationships the bar-graphs represent. For example, without the appropriate labels, it is not possible to distinguish between the bar-graphs representative of camber, caster, and toe angles. Accordingly, motor vehicle wheel alignment displays have been produced which provide a quasi-three dimensional view as seen in FIG. 2A of both U.S. Pat. Nos. 5,535,522 and 5,724,743 to Jackson.

Quasi-three dimensional views, such as shown in the '522 and '743 patents, overlays a static perspective view of the motor vehicle wheels and suspension system with dynamic alignment and angular relationship information obtained from a wheel alignment system. While the static perspective image never changes, the dynamic alignment and angular relationship information, in the form of vectors, is altered on the display to correspond to any changes the technician might make to the vehicle wheel alignment. While such displays provide the technician with a more intuitive display of the angular relationships involved in the alignment of motor vehicle wheels, they suffer from several drawbacks. First, due to the static nature of the background image, some of the wheel alignment angle vectors displayed are not positioned at an optimum angle for viewing, and may be partially obscured by the various wheel and suspension components shown in the static image. Second, the static background is misleading to a technician, as it never varies even if a motor vehicle wheel is drastically out of alignment with respect to the remaining motor vehicle wheels and chassis. This can lead to a false impression that the wheels are properly aligned if a technician does not pay careful attention to the positioning of the alignment vectors. Finally, in an attempt to optimize the viewing of all the associated wheel alignment vectors, the motor vehicle wheels shown in the static image are not shown in the correct perspective view, but rather are distorted in size relations.

Accordingly, there is a need in the industry for a display device and method capable of displaying a real-time three-dimensional image of a motor vehicle wheel and suspension system, together with accurately determined wheel alignment and angular relationship information, in such a manner as to provide a technician with an intuitive and flexible representation of the actual alignment and angular relationships.

BRIEF SUMMARY OF THE INVENTION

Among the several objects and advantages of the present invention are:

The provision of a three-dimensional wheel alignment display system adapted to display a three-dimensional perspective representation of at least one motor vehicle wheel and associated suspension components in an angular relation relative to a vehicle chassis;

The provision of the aforementioned three-dimensional wheel alignment display system wherein the display system is responsive to input signals representative of current wheel alignment positions to manipulate the displayed three-dimensional perspective representation proportional to the input signals;

The provision of the aforementioned three-dimensional wheel alignment display system wherein the displayed perspective representation comprises individual elements representing vehicle wheels and suspension components independently orientated relative to each other to correspond to actual vehicle wheel alignment and angular relationships on a motor vehicle undergoing alignment testing;

The provision of the aforementioned three-dimensional wheel alignment display system wherein the display system selects predetermined perspective representations corresponding to user-input selections;

The provision of the aforementioned three-dimensional wheel alignment display system wherein the display system is configured to smoothly rotate the displayed image from a first perspective representation to a second perspective representation;

The provision of the aforementioned three-dimensional wheel alignment display system wherein the system is configured to display numerical and graphical representations of actual camber, caster, and toe angles for the represented motor vehicle wheel and suspension components; and The provision of the aforementioned three-dimensional wheel alignment display system wherein the system is intuitive to use, provides a functional visual indication of motor vehicle wheel alignment, and facilitates wheel alignment adjustment on the actual motor vehicle.

Briefly stated, the three-dimensional wheel alignment display system and method of the present invention includes a processor and display unit interconnected with a motor vehicle wheel alignment system adapted to determine vehicle wheel angular relationships such as camber, caster, and toe. The processor of the display system is configured to manipulate portions of a digital three-dimensional model of at least one motor vehicle wheel and associated suspension components to correspond to the angular relationships determined by the wheel alignment system. The processor is further configured to interactively display the digital three-dimensional model on the display unit, and to continually update the displayed image as signals are received from the wheel alignment system representative of alterations to the wheel alignment angular relationships made by a technician. The processor is further configured to smoothly alter the interactive display to focus on a particular angular relationship of interest, or to view the overall wheel and suspension layout of the motor vehicle, in response to user input commands.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 1:
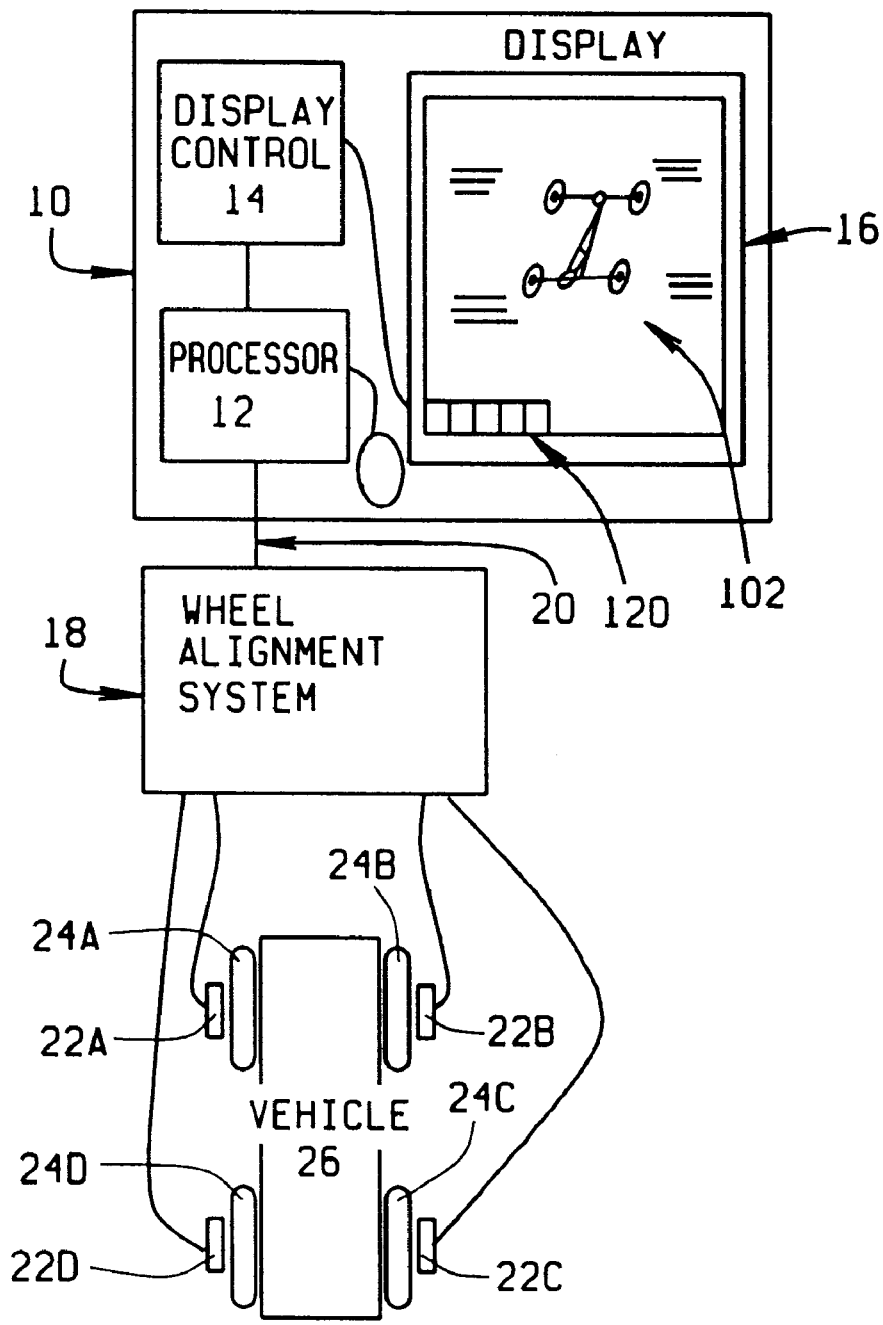
FIG. 1 is a diagram illustrating the interconnection between the components of the present invention and a wheel alignment system.

The three-dimensional wheel alignment display system of the present invention is indicated generally at 10 in FIG. 1. The display system 10 comprises a processor 12, preferably a commonly available IBM-compatible personal computer, interconnected with an input unit 13, such as a mouse or keyboard, and with a display control unit 14, for controlling the presentation of information on a display screen 16. The display system 10 receives signals from a wheel alignment system 18 through a communications link 20. The wheel alignment system 18 incorporates a number of wheel alignment sensors 22A–22D, each associated with a separate wheel 24A–24D on a motor vehicle 26 undergoing alignment testing. Each alignment sensor 22A–22D provides an indication of various wheel alignment angles to the wheel alignment system 18, such as camber, caster, and toe for each wheel 24A–24D. Those skilled in the art will recognize that the specific type of wheel alignment system 18 utilized with the display system 10 of the present invention is not critical, and for example, may be either an optical wheel alignment system utilizing optical sensors and targets to determine wheel alignment, or may be a more traditional clamp-on alignment sensing system. Similarly, the wheel alignment system may merely include a means of an operator to provide numerical input representative of wheel alignment relationships. In the preferred embodiment, the wheel alignment system 18 is capable of providing wheel alignment information to the display system 10 on a continuous or frequently updated basis, corresponding to alignment changes made to vehicle 26 by a technician or user. One skilled in the art will also recognize that while the display system 10 is shown in FIG. 1 as separate from the wheel alignment system 18, that it may be incorporated within the same housing as the wheel alignment system or may be integrated into the wheel alignment system processing unit and display unit (not shown).

Turning now to FIG. 2 through FIG. 5, various displays of a preferred three-dimensional model 100 representative of the motor vehicle wheels 24A–24D and associated steering and suspension components are shown displayed on display screen 16. The three-dimensional model 100 is composed of individual elements, and is one of a number of three-dimensional models digitally stored in processor 12, corresponding to a variety of types of common vehicles 26 and wheel alignment parameters and angular relationships. For example, different suspension components and vehicle drive-line layouts may be modeled, such as front-wheel drive vehicles, rear-wheel drive vehicles, and four-wheel drive vehicles, as well as various steering and suspension systems such as McPherson strut, double-wishbone, and leaf-spring suspensions. Similarly, stylized three-dimensional models illustrating only wheel alignment parameters and angular relationships through abstract representations such as intersecting camber, caster, and toe planes, without illustrating vehicle components may be utilized within the scope of this invention. During operation, the technician will utilize the input unit 13 to select an appropriate model 100 for display on the display system 10, corresponding to the vehicle undergoing alignment testing, or the type of perspective view desired.

To display the three-dimensional model 100 on the display screen 16, the processor 12 is configured with suitable graphical rendering software to manipulate a perspective view of the stored model 100, and to direct the display control unit 14, preferably a three-dimensional graphics accelerator add-on board, to present a perspective view 102 of the model 100 on the display screen 16. Unlike a static quasi-three dimensional images of the prior art, each element of the digital three-dimensional model 100 may be independently articulated by the processor 12 relative to the remaining components to correspond to a variety of positions and orientations. Processor 12 preferably receives signals from the wheel alignment system 18 indicative of the current alignment and orientation for the wheels 24A–24D of the vehicle 26 undergoing alignment testing. In alternative embodiments, the received signals may be generated by user input or other data entry means rather than received directly from the wheel alignment system 18. Utilizing the received information, the processor 12 is configured to manipulate and render the elements comprising the three-dimensional model 100 to correspond proportionally to the alignments and angular relationships determined by the wheel alignment system 18. It will be readily understood that the digital manipulation of model 100 may include the use of at least one scaling factor to exaggerate very small scale changes in wheel alignment, rendering such changes visible in the perspective view 102 on the display screen 16. As the three-dimensional model 100 is digitally manipulated by the processor 12, the display control unit 14 simultaneously controls the display screen 16 to display the perspective view 102 of the manipulated model 100, allowing the technician to observe on the display screen 16 the effects of any alterations to the wheel alignment of vehicle 26.

Figure 2:
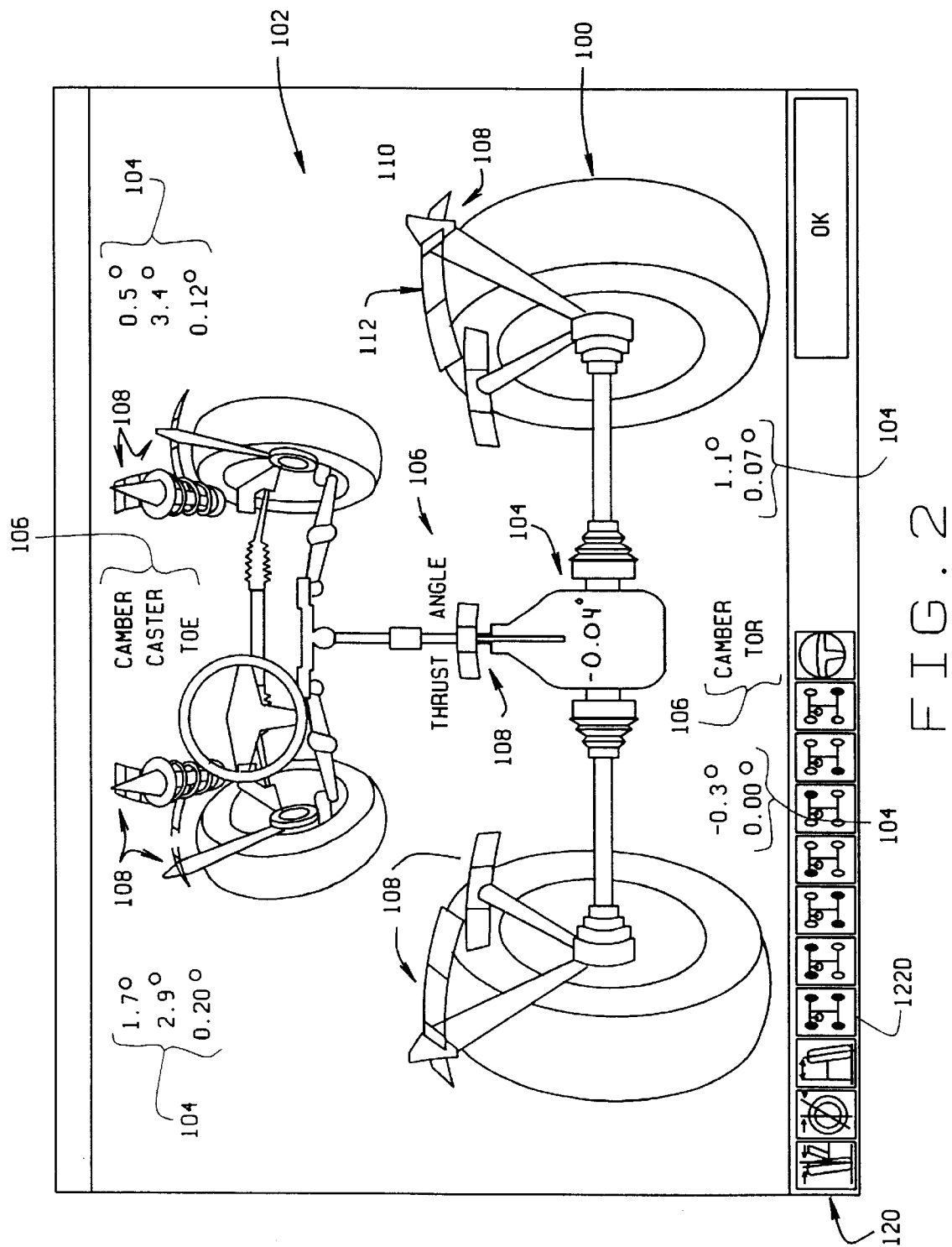
FIG. 2 is a perspective view of a three-dimensional model illustrating a motor vehicle wheel alignment and suspension system, incorporating alignment and angular relationship information received from a wheel alignment system.

In addition to rendering and manipulating the three-dimensional model 100 to correspond to the relative positions of the vehicle wheel, steering, and suspension alignments, processor 12 is further configured to produce overlay alignment information for display on display screen 16 and to receive and carry out commands relating to the presentation of model 100. Information received from the wheel alignment system 18 is additionally utilized by the processor 12 to produce numerical representations of actual and desired alignment angles, as well as graphical guides. As best seen in FIG. 2, processor 12 provides overlay alignment information in the form of numerical values 104 to the display control unit 14 for display, simultaneously with the perspective display of model 100 on display screen 16. The numerical values 104 preferably include the current camber, toe, and where appropriate, caster angles for each wheel 24A–24D, with each numerical value displayed adjacent the wheel to which it corresponds. In the preferred embodiment, additional labels, as at 106, are provided to indicate which angle each numerical value corresponds to.

The preferred embodiment of the graphical guides provided by the processor 12, as seen at 108, are stylized vectors 110 and arcuate sectors 112 representing the angular direction in which a vehicle wheel 24A–24D or suspension component is aligned. As seen in FIGS. 2–5, these graphical guides 108 are overlaid onto the perspective image of model 100 in addition to the numerical values 104, providing an additional alignment reference for the technician operating the display system 10. Each arcuate sector 112 has a length corresponding proportionally to the maximum adjustment arc through which the particular associated component may be aligned. As shown best in FIG. 3 through FIG. 5, each arcuate sector 112 is sub-divided into three adjacent regions 114A, 114B, and 114C. The outermost regions, 114A and 114C, preferably outlined in red on display screen 16, correspond to alignment orientations which do not fall within a predetermined acceptable tolerance range, for example, tolerable deviations from a factory alignment setting. The central region, 114B, preferably represented as solid green, corresponds to acceptable or in-tolerance variations to the alignment orientation. One skilled in the art will recognize that alternate embodiments may include a variety of color representations, for example, yellow to indicate a marginally in or out of tolerance specification, within the scope of this invention.

Figure 3:
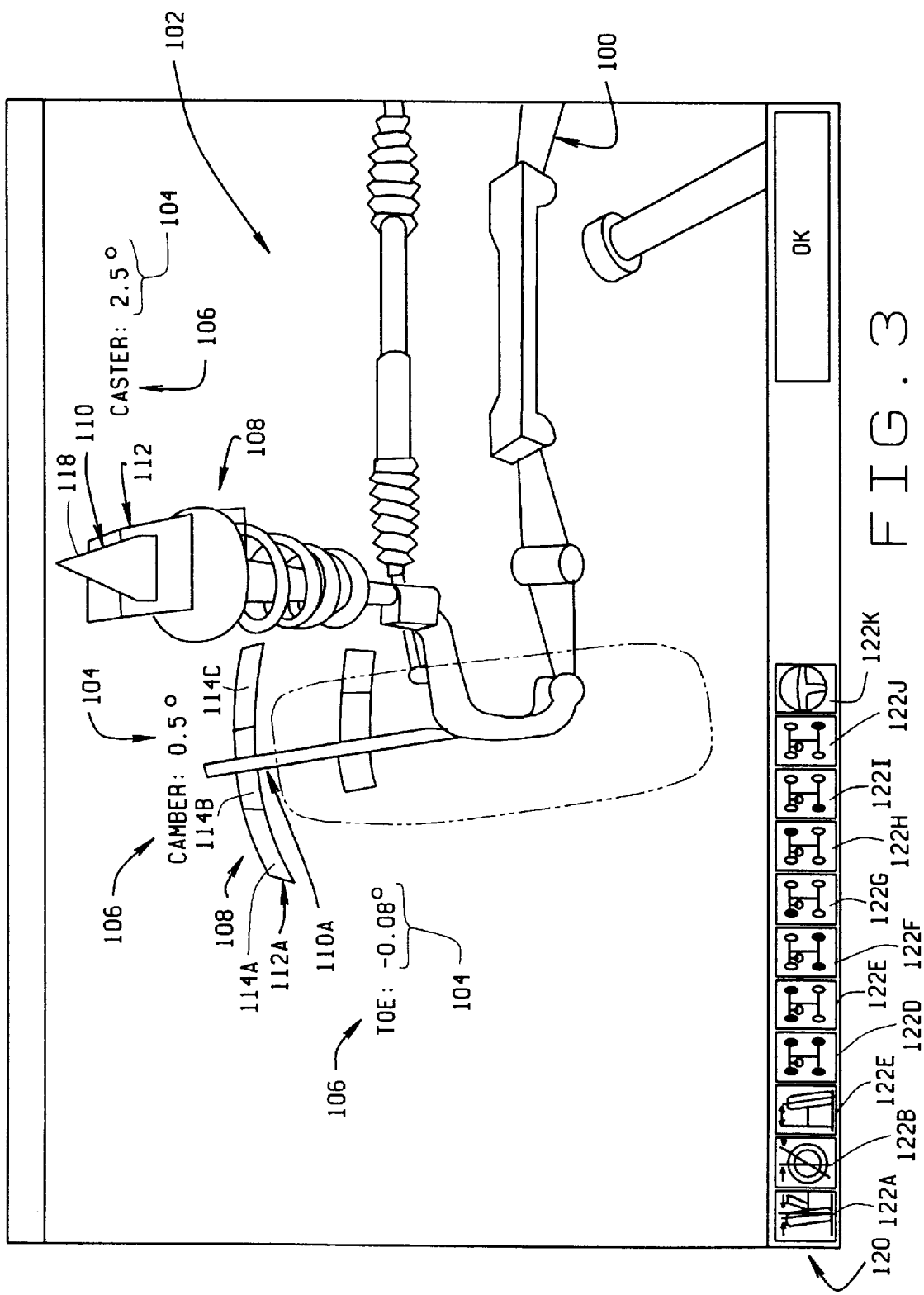
FIG. 3 is a perspective view of a portion to the three-dimensional model in FIG. 2, emphasizing the camber angle of the front-left motor vehicle wheel.
Figure 4:
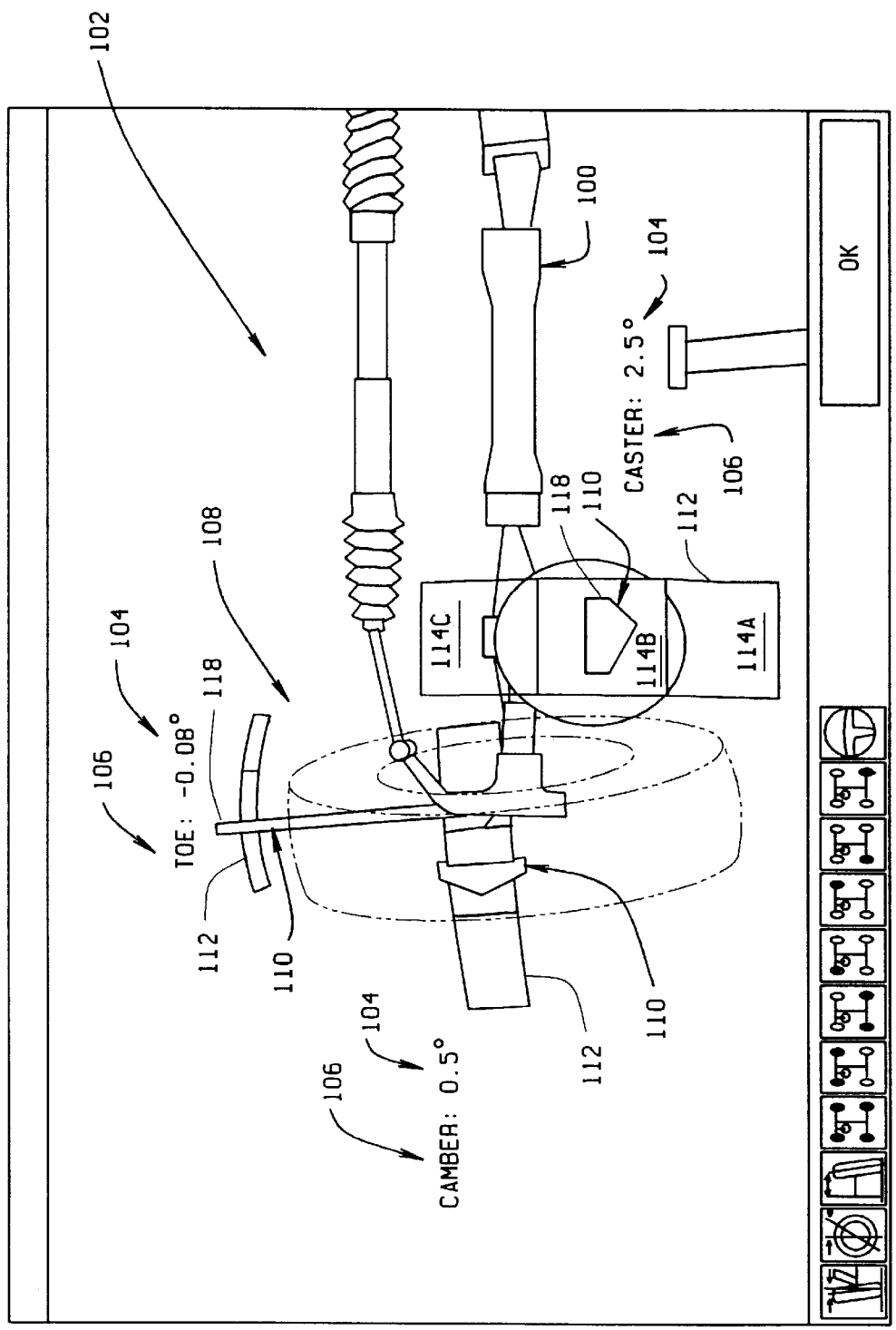
FIG. 4 is a perspective view of a portion of the three-dimensional model in FIG. 2, emphasizing toe angle of the front-left motor vehicle wheel.
Figure 5:
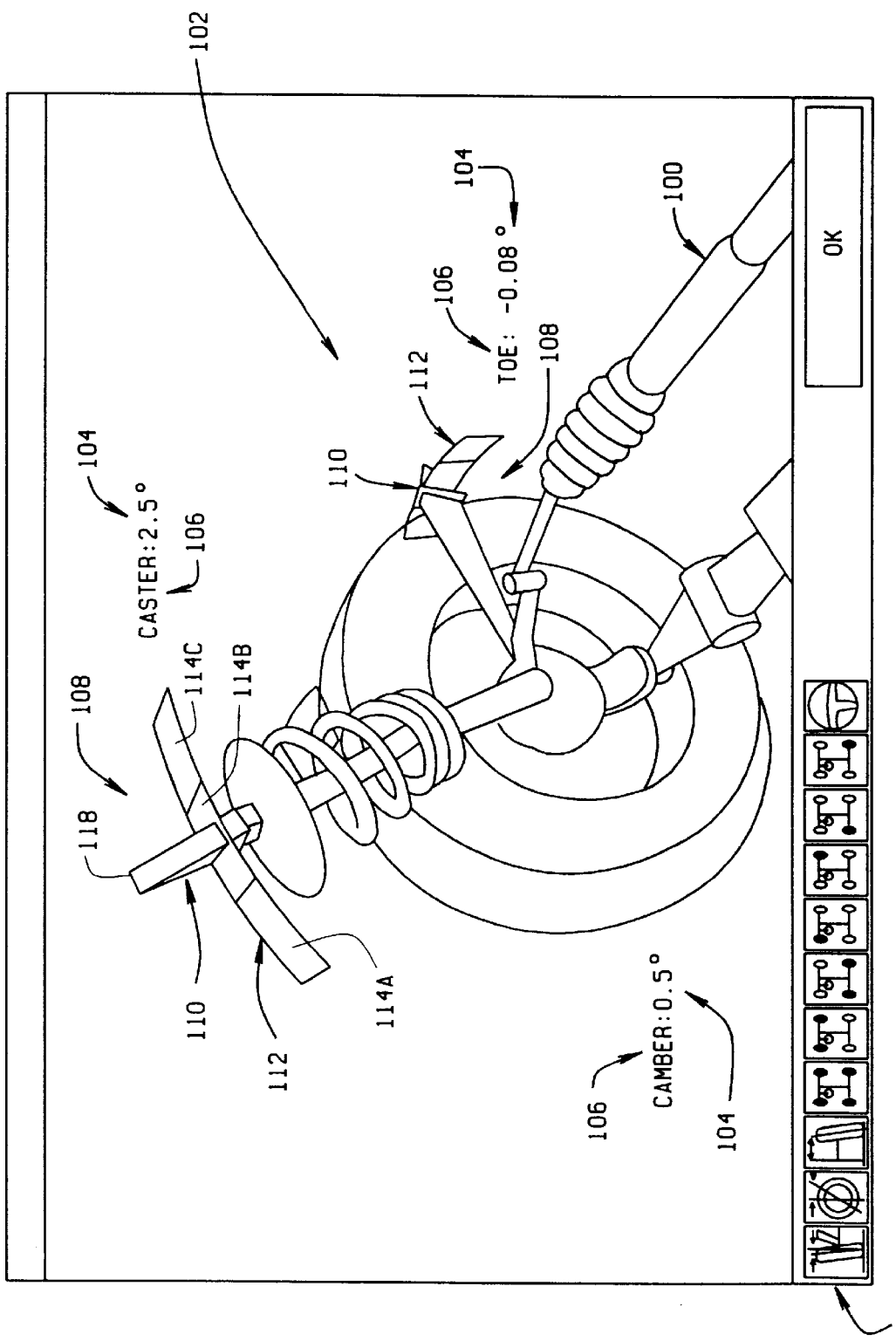
FIG. 5 is an altered perspective view of a portion of the three-dimensional model in FIG. 2, emphasizing the caster angle of the front-left motor vehicle wheel.
Figure 8:
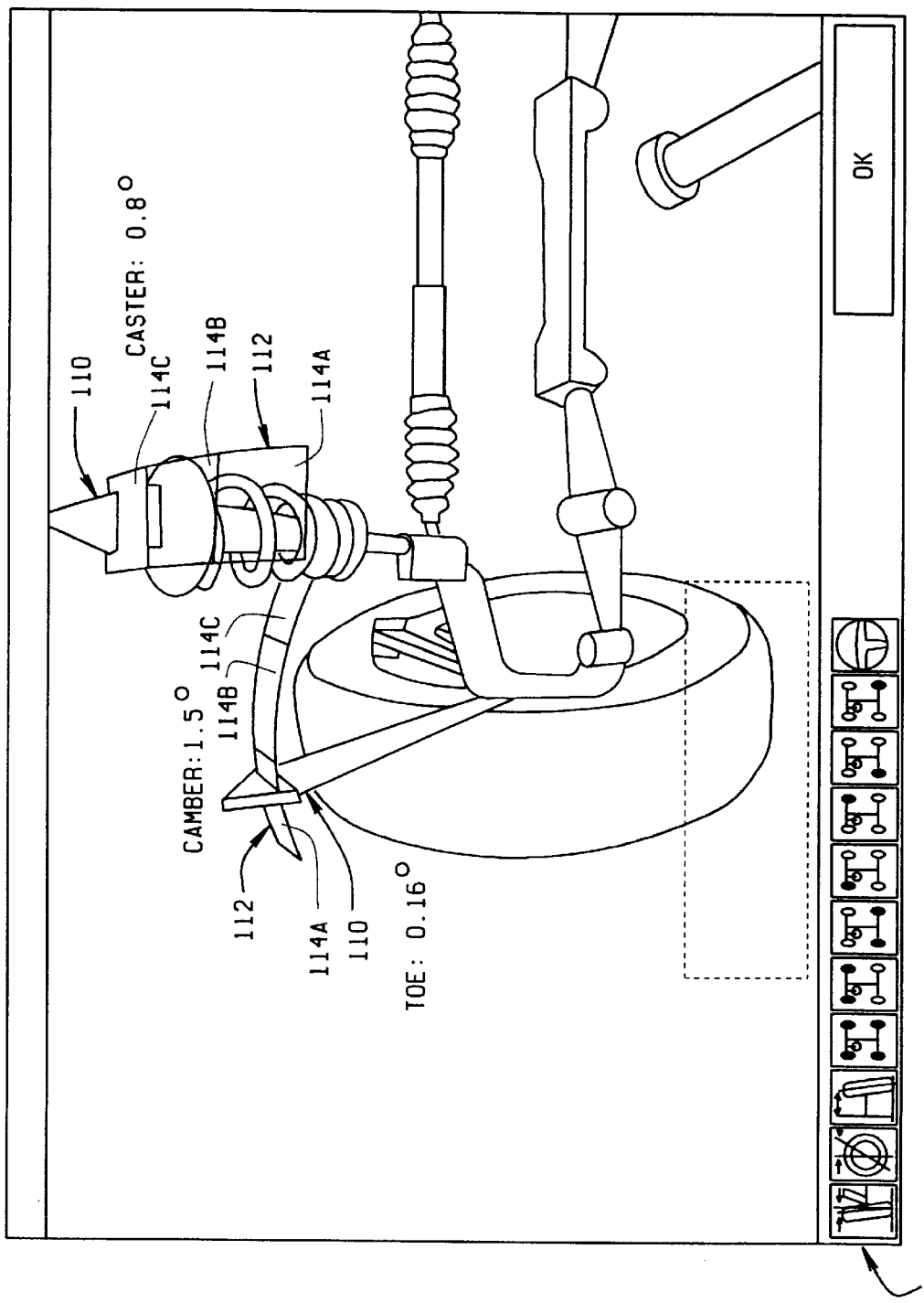
FIG. 8 is a view similar to FIG. 1, illustrating out-of-specification measurements on the camber, caster, and toe angles for the front-left vehicle wheel.

Associated with each arcuate sector 112 is a stylized vector 110, representative of the angular orientation shown by the arcuate sector 112. The vector 110 is calculated by the processor 12 to correspond proportionally to the actual angle of the associated vehicle wheel 24A–24D as determined by the wheel alignment system 18. One skilled in the art will recognize that the proportional relationship need not be constant, but may vary such a scaling factor allows for display of finer variations as the actual angles approach the desired specifications. In the preferred embodiment, the head 118 of each vector 110 intersects an associated arcuate sector 112, and the color of a visible portion of the vector is determined by the color of the region 114A–114C within which the vector head 118 lies. For example, as is shown in FIG. 3, the camber angle for the digital representation in model 100 of wheel 24A is within an acceptable tolerance angle, and accordingly, the vector $110_A$ associated with the camber arcuate sector $112_A$ lies within the region $114B_A$, and is colored green. In contrast, as is shown in FIG. 8, the caster, camber, and toe angles for the digital representation in model 100 of wheel 24B is shown outside of an acceptable tolerance angle, and accordingly, the vectors 110 associated with each arcuate sector 112 lie within regions 114A or 114C, and are colored red to indicate an out-of tolerance alignment angles.

As seen in FIGS. 2–5, a portion 120 of the display screen 16 is reserved for technician input, preferably in the form of selectable icons 122A–122K, indicated in FIG. 3. These icons are selectable by a technician using input unit 13 with traditional point-and-click methods, or another suitable input method. Selection of a particular icon 122A–122K signals to processor 12 to alter the perspective view 102 of the digital three-dimensional model 100 to a new predetermined viewing orientation, or allows for the viewing of a specific portion or angular relationship. For example, as shown in FIG. 2, an icon 122D is shown to be selected, corresponding to an elevated anterior overall perspective view 102 of all four vehicle wheels 24A–24D, while in FIG. 3, selection of icon 122G corresponds to a close-up view of only the portion of model 100 corresponding to the left-front wheel 24A and its associated suspension components. Icons 122A–122C are associated with specific angular relationships, such as camber, caster, and toe.

Selection of an icon 122A–122C signals the processor 12 to rotate the perspective view 102 of the digital three-dimensional model 100 to provide the best view of the selected angular relationship for the portion of the model

100 current shown in perspective view 102. In this manner, the technician operating the display system 10 may select from a number of predetermined perspective views of the digital three-dimensional model 100, and the processor 12 will correspondingly render the appropriate view and cause it to be displayed on the display screen 16 through the display control 14. Similarly, the user may select a specific displayed wheel, vector, steering, or suspension component shown in the display, and the processor 12 will rotate and zoom the perspective view 102 to provide the best view of the selected component. If a displayed component, such as a steering wheel 124 shown in FIG. 9 or displayed angle, is selected and adjusted, the processor 12 is configured to virtually actuate the steering element or angle and provide for movement of the vehicle wheels and alignment alterations corresponding to movement of the steering component or selected angle. It will be readily recognized by those skilled in the art that the manipulation of the perspective view 102 may be done without providing continual updates to the system regarding current wheel alignment and angular relationships. For example, the perspective view 102 may be initially determined by the processor 12 and then rotated and zoomed to provide the technician with various views of the image without changing the initially determined wheel alignment and angular relationship orientations.

In the preferred embodiment, the transition between one selected view and another is performed as a smooth animation, rather than an abrupt viewpoint transition. In the preferred embodiment, the total time for each smooth animation is predetermined, with the number of animation frames to display based on the capabilities of the processor 12. In alternate embodiments, the user may specify the animation attributes such as either the animation time, or the number of animation frames to be displayed for each transition.

Figure 9:
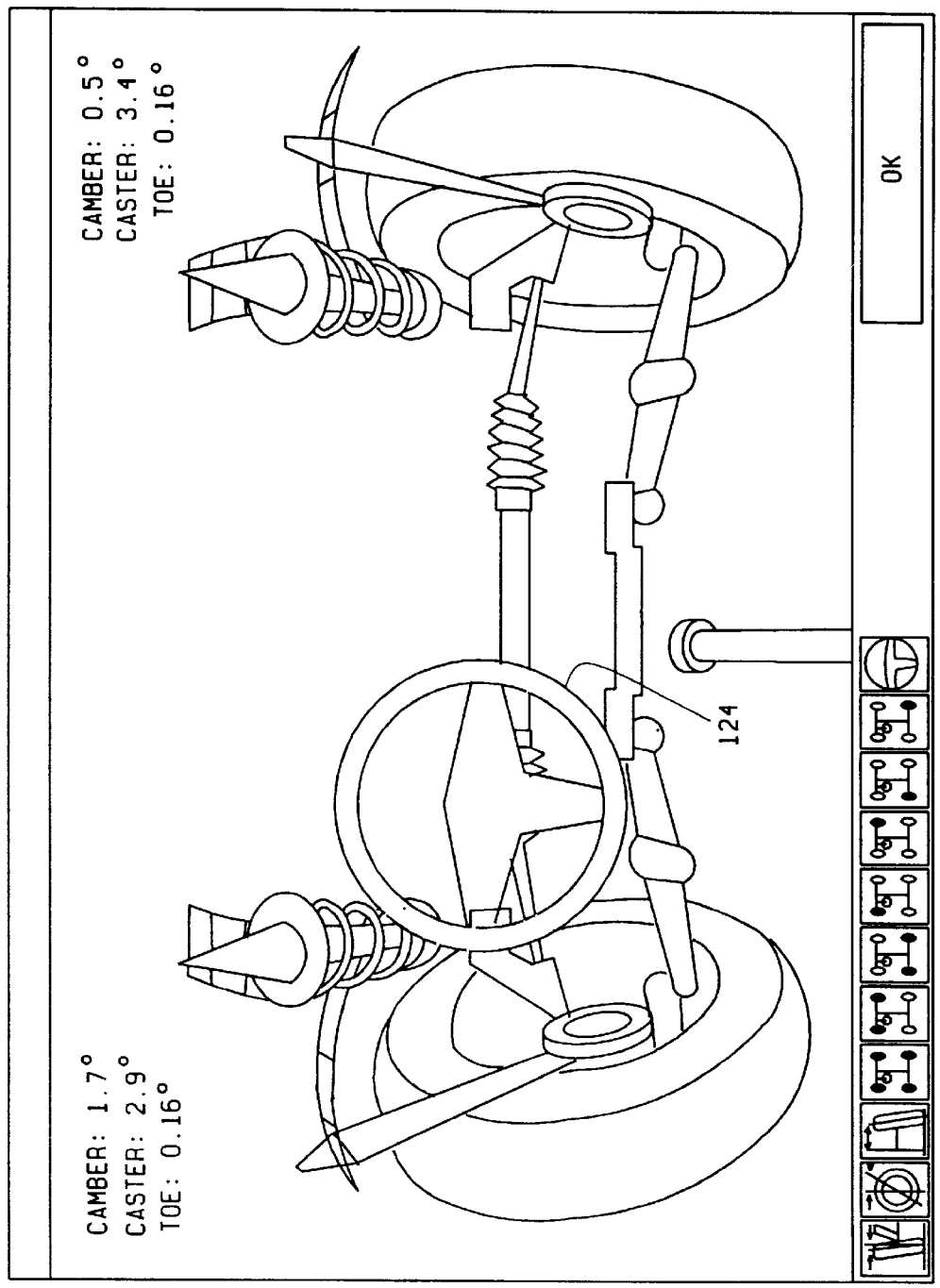
FIG. 9 is a perspective view of a portion of the three-dimensional model of the motor vehicle undergoing alignment testing, illustrating the addition of steering components to the display.

To facilitate the display of information on the display screen 16, some of the features of the model 100 may be rendered in a transparent color, as best seen in FIG. 2, allowing portions of the model 100 and other information which would be hidden behind a solid rendering to be visible on the display screen 16. Similarly, as shown in FIG. 9, the three-dimensional model 100 may include digital representations of various suspension and steering components for the vehicle 26 which may be selectively displayed on the display screen 16, or eliminated from the display screen 16 to provide a clearer view of the displayed perspective image 102.

Figure 6:
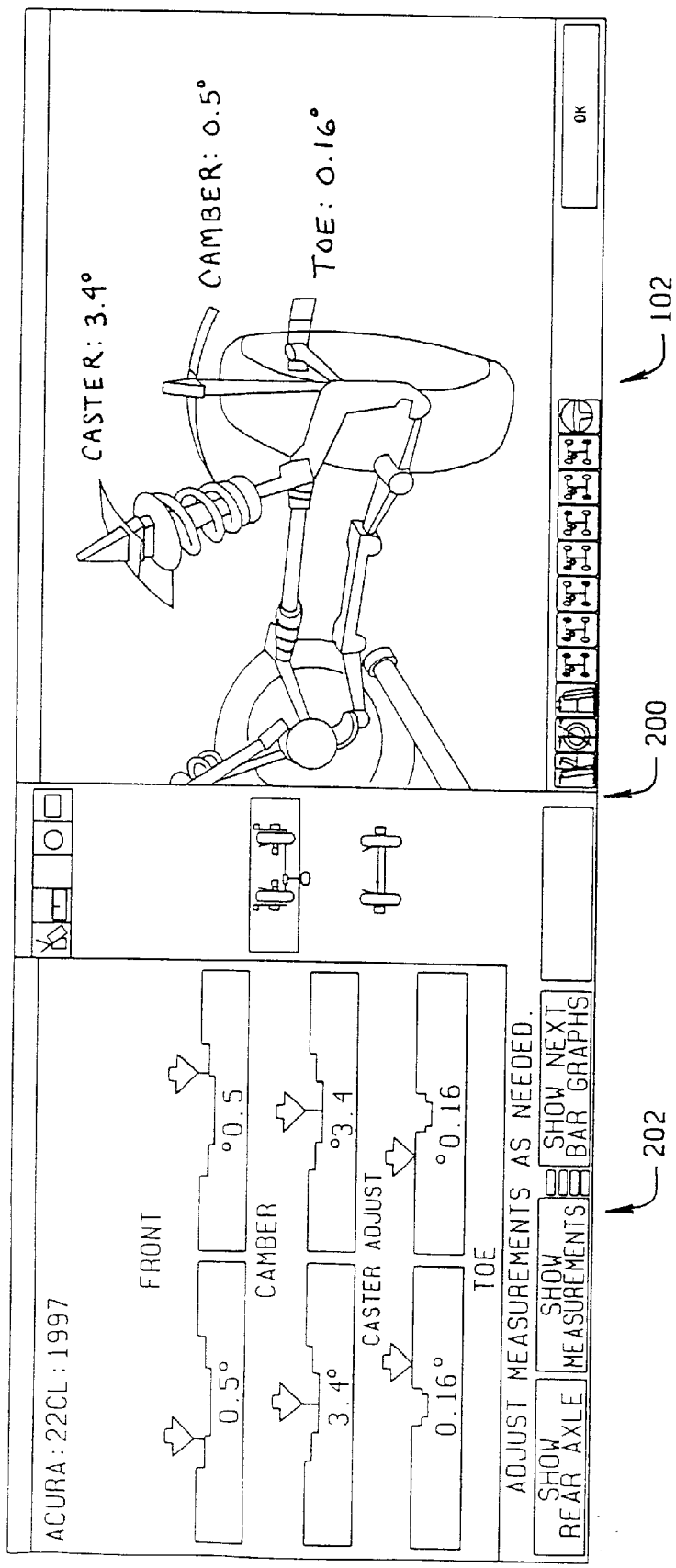
FIG. 6 is an illustration of the display of the present invention operating in dual-window mode, presenting both traditional and three-dimensional views of the current wheel alignment for a motor vehicle undergoing alignment testing.
Figure 7:
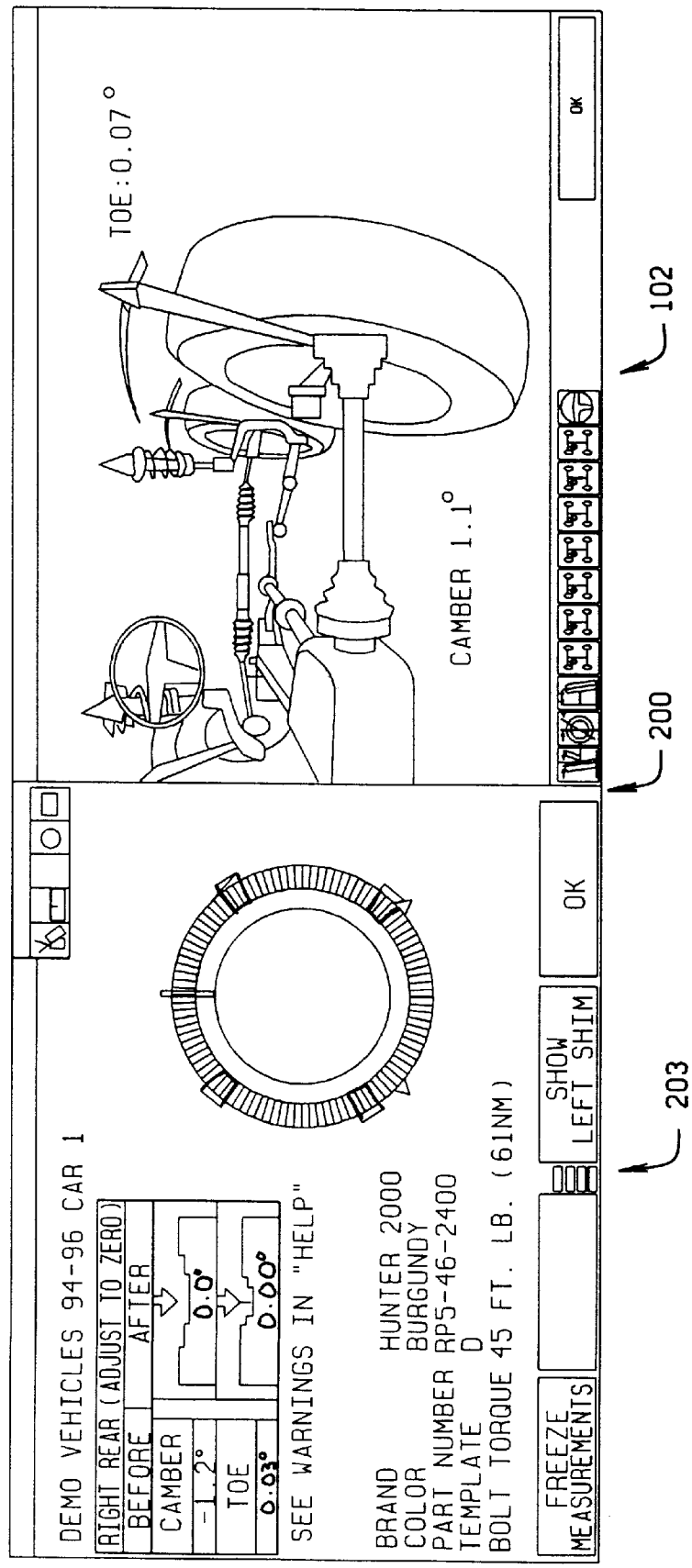
FIG. 7 is an illustration similar to FIG. 6, presenting a shim orientation display and a three-dimensional view of the current wheel alignment for a motor vehicle undergoing alignment testing.

In an alternate embodiment shown in FIGS. 6 and 7, the perspective display of the digital three-dimensional model 102 may be presented to the technician or other operator in a windowed or multiple monitor display environment 200, adjacent a traditional bar-graph display 202 (FIG. 6) or other information display from the wheel alignment system 18, such as a shim positioning display 203 (FIG. 7). On a display such as is shown in FIG. 6, changes in wheel alignment detected by the wheel alignment system 18 will simultaneously be displayed both on the adjacent display and on the digital three-dimensional model 100, providing the technician with a very intuitive view of how the various alignment angles and relationships have been altered.

Alternative embodiments of the present invention may include a training or simulation mode, whereby the technician may effect changes to the angular relationships shown in either the perspective view 102 or the bar-graph display 202 through the input device 13, with the corresponding display updating to show the input changes. For example, the technician may select and alter the camber angle shown for a particular wheel and preferably highlighted on a bar-graph display 202, and immediately view the results of the camber angle alteration on the display screen 16 showing the perspective view 102 of the same camber angle, or correspondingly, select and alter a vector in the perspective view 102 and view the changes on the bar-graph display 202. In an additional example, a technician may select a representation of the vehicle thrust line on the perspective view 102, and alter it to a new orientation, causing the processor to generate and display an altered perspective view which incorporates the angular changes in the rear wheels of the vehicle resulting from the altered thrust line.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. A wheel alignment display system for use with a motor vehicle wheel alignment system configured to determine a plurality of motor vehicle wheel alignment relationships and angular positions for at least one motor vehicle wheel and associated vehicle suspension components, comprising:

a processing means configured to manipulate a digital three-dimensional model of said at least one motor vehicle wheel, said model comprising a plurality of elements representative of said at least one motor vehicle wheel;

a display means communicatively interconnected with said processing means, said display means configured to display said manipulated digital three-dimensional model of said at least one motor vehicle wheel; and said processing means further configured to receive signals representative of current wheel alignment relationships and angular positions of said at least one motor vehicle wheel, responsive to said received signals, said processing means configured to manipulate at least one of said elements of said digital three-dimensional model to correspond proportionally to the current wheel alignment relationships and angular positions indicated by said received signals.

2. The wheel alignment display system of claim 1 wherein said signals representative of current wheel alignment relationships and angular positions of said at least one motor vehicle wheel are received from said motor vehicle wheel alignment system.

3. The wheel alignment display system of claim 1 wherein said signals representative of current wheel alignment relationships and angular positions of said at least one motor vehicle wheel are received from an external source.

4. The wheel alignment display system of claim 1 wherein said display means is further configured to display at least one image selection means representative of a perspective orientation of said display of said digital three-dimensional model.

5. The wheel alignment display system of claim 4 wherein said processing means is configured to respond to selection of said image selection means to manipulate at least one of said plurality of motor vehicle wheel alignment relationships and wheel alignment angles in said digital three-dimensional model.

6. The wheel alignment display system of claim 4 wherein said processing means is configured to respond to selection of said image selection means to alter a perspective orientation of at least one element in said display of said manipulated digital three-dimensional model to correspond proportionally to a perspective view indicated by said image selection means.

7. The wheel alignment display system of claim 6 wherein said processing means is configured to calculate an optimum perspective view of said three-dimensional model corresponding to said perspective view indicated by said image selection means.

8. The wheel alignment display system of claim 1 wherein said processing means is further configured to respond to selection of at least one of said plurality of elements of said digital three-dimensional model to alter said perspective orientation of said three-dimensional model display to optimize viewing of said selected elements.

9. The wheel alignment display system of claim 1 wherein said display means is further configured to display portions of said manipulated digital three-dimensional model in a transparent form.

10. The wheel alignment display system of claim 1 wherein said processing means is further configured to animate transitions in said manipulated three-dimensional digital model corresponding to said received signals.

11. The wheel alignment display system of claim 1 wherein said display means is further configured to display a selected portion of said digital three-dimensional model of said motor vehicle wheel.

12. The wheel alignment display system of claim 11 wherein said selected portion corresponds to at least one vehicle suspension subsystem.

13. The wheel alignment display system of claim 1 wherein said processing means is further configured to interpret said received signals to transfer indicia of said current wheel alignment relationships and angular positions of said motor vehicle wheel to said display means, said display means responsive to said transferred indicia to overlay said indicia on said displayed three-dimensional model.

14. The wheel alignment display system of claim 13 wherein said indicia of current wheel alignment relationships and angular positions comprise a plurality of numerical values representative of said motor vehicle wheel alignment relationships and angles.

15. The wheel alignment display system of claim 13 wherein said indicia of current angular positions comprise a plurality of graphical representations of said motor vehicle wheel alignment relationships and angular positions.

16. The wheel alignment display system of claim 1 wherein said digital three-dimensional model further comprises a plurality of elements representative of at least suspension component associated with said at least one motor vehicle wheel.

17. A wheel alignment display system for use with a vehicle wheel alignment system configured to determine a plurality of vehicle wheel alignment relationships and angular positions for at least one vehicle wheel, comprising:
    a processing means;
    a display means communicatively interconnected with said processing means;
    wherein said processing means is configured to:
        (i) manipulate a digital three-dimensional model of said at least one motor vehicle wheel, said display means configured to display said manipulated digital three-dimensional model of said at least one motor vehicle wheel;
        (ii) receive signals representative of current wheel alignment relationships and angular positions of said at least one motor vehicle wheel,
        (iii) responsive to said received signals, interpret said received signals to transfer indicate comprising a plurality of graphical representations of said current wheel alignment relationships and current angular positions of said at least one motor vehicle wheel, said display means further responsive to said transferred indicia to overlay said indicia on said displayed three-dimensional model, and
        (iv) responsive to said received signals, manipulate said digital three-dimensional model to correspond proportionally the relationships and positions indicated by said received signals;
    said plurality of graphical representations including at least one digital representation of an arcuate sector corresponding proportionally to a range of angular positions, and at least one associated vector intersecting said arcuate sector, said associated vector corresponding to said motor vehicle wheel alignment angle represented; and
    wherein said arcuate sector comprises at least a first outer region, a central region, and a second outer region opposite said first outer region, said first and second outer regions corresponding proportionally to angular positions which are not within a predetermined tolerance, and said center region corresponding proportionally to angular positions within said predetermined tolerance.

18. The wheel alignment display system of claim 17 wherein said arcuate sector further comprises a first intermediate region interposed between said first outer region and said central region, and a second intermediate region interposed between said second outer region and said central region, said first and second intermediate regions corresponding proportionally to angular positions with are marginally within predetermined tolerance.

19. A method for displaying a three-dimensional representation of at least one motor vehicle wheel, together with a visual indication of vehicle wheel alignment parameters and angular relationships, comprising the steps of:
    displaying a perspective view of a three-dimensional digital model of said at least one motor vehicle wheel on a display means, said three-dimensional digital model comprising a plurality of elements;
    receiving at a processing means signals representative of said wheel alignment parameters and angular relationships for said at least one motor vehicle wheel;
    manipulating digitally in said processing means, at least one of said plurality of elements of said three-dimensional digital model such that said at least one motor vehicle wheel of said three-dimensional digital model are aligned and related correspondingly proportional to said received signals; and
    updating said display of said three-dimensional digital model to alter at least one of said plurality of elements responsive to said digital manipulation.

20. The method for displaying a three-dimensional representation of at least one motor vehicle wheel of claim 19 wherein said signals representative of said wheel alignment parameters and angular relationships for said at least one motor vehicle wheel are transmitted from a motor vehicle wheel alignment system configured to determine current wheel alignment parameters and angular relations for said at least one motor vehicle wheel.

21. The method for displaying a three-dimensional representation of at least one motor vehicle wheel of claim 19 wherein said signals representative of said wheel alignment parameters and angular relationships for said at least one motor vehicle wheel are transmitted from an external input device.

22. The method for displaying a three-dimensional representation of at least one motor vehicle wheel of claim 19 wherein said signals representative of said wheel alignment parameters and angular relationships for said at least one motor vehicle wheel are simulated from user-input.

23. The method for displaying a three-dimensional representation of at least one motor vehicle wheel of claim 19 where said signals representative of said wheel alignment parameters and angular relationships are generated by selection and manipulation of an element of said displayed three-dimensional model by a user.

24. The method for displaying a three-dimensional representation of at least one motor vehicle wheel of claim 23 wherein selection and adjustment of a displayed caster vector in said displayed three-dimensional model signals said processing means to digitally manipulate said three-dimensional digital model to correspond to said adjusted caster vector.

25. The method for displaying a three-dimensional representation of at least one motor vehicle wheel of claim 23 wherein selection and adjustment of a displayed toe vector in said displayed three-dimensional model signals said processing means to digitally manipulate said three-dimensional digital model to correspond to said adjusted toe vector.

26. The method for displaying a three-dimensional representation of at least one motor vehicle wheel of claim 23 wherein selection and adjustment of a displayed steering component in said displayed three-dimensional model signals said processing means to digitally manipulate said three-dimensional digital model to correspond to said adjusted steering component.

27. The method for displaying a three-dimensional representation of at least one motor vehicle wheel of claim 23 wherein selection and adjustment of a displayed element in said displayed three-dimensional model signals said processing means to digitally manipulate said three-dimensional digital model to correspond to said adjustment.

28. The method for displaying a three-dimensional representation of at least one motor vehicle wheel of claim 23 wherein selection and adjustment of a displayed camber vector in said displayed three-dimensional model signals said processing means to digitally manipulate said three-dimensional digital model to correspond to said adjusted camber vector.

29. The method for displaying a three-dimensional representation of at least one motor vehicle wheel of claim 19 further including animating transitions between said displayed manipulated digital image and said updates of said digitally manipulated three-dimensional digital model corresponding to said additional received signals.

30. The method for displaying a three-dimensional representation of at least one motor vehicle wheel of claim 29 further including varying animation attributes responsive to user input.

31. The method of claim 19 for displaying a three-dimensional representation of at least one motor vehicle wheel, together with a visual indication of vehicle wheel alignment parameters and angular relationships wherein said three-dimensional digital model of said at least one motor vehicle wheel includes at least one element representative of at least one suspension component associated with said at least one motor vehicle wheel.

32. A method for displaying, in a motor vehicle wheel alignment system, a three-dimensional representation of at least one motor vehicle wheel comprising the steps of:
displaying, on a display, said three-dimensional representation of at least one motor vehicle wheel;
receiving a signal representing a desired perspective representation of said three-dimensional digital model;
calculating, at a processing means, a perspective representation of said three-dimensional digital model corresponding to said desired perspective representation; and
altering said display of said three-dimensional representation to correspond to said calculated perspective representation of said three-dimensional digital model.

33. The method of claim 32 for displaying, in a motor vehicle wheel alignment system, a three-dimensional representation of at least one motor vehicle wheel wherein said three-dimensional representation of at least one motor vehicle wheel further comprises a representation of at least one suspension component associated with said at least one motor vehicle wheel.

34. A method for displaying, in a motor vehicle wheel alignment system, a three-dimensional representation of at least one motor vehicle wheel comprising the steps of:
receiving a signal representing a desired wheel alignment parameter and angular relationship of said at least one motor vehicle wheel for display;
selecting, at a processing means, a predetermined perspective representation of said three-dimensional digital model corresponding to said desired wheel alignment parameter and angular relationship;
manipulating said three-dimensional digital model to correspond to said predetermined perspective representation; and
displaying said manipulated three-dimensional digital model corresponding to said predetermined perspective representation on a display means.

35. The method for displaying a three-dimensional representation of at least one motor vehicle wheel of claim 34 further including animating a transition between said displayed manipulated digital image and said selected perspective.

36. A method for displaying a three-dimensional representation of vehicle wheel alignment parameters and angular relationships for at least one motor vehicle wheel, comprising the steps of:
displaying a perspective view of a three-dimensional digital model of said at least one motor vehicle wheel on a display means, said at least one motor vehicle wheel having angular relationships and alignment parameters;
receiving at a processing means signals representative of current wheel alignment parameters and current angular relationships for said at least one motor vehicle wheel;
manipulating digitally in said processing means said three-dimensional digital model such that wheel alignment parameters and angular relationships represented on said three-dimensional digital model are correspondingly proportional to said received signals;
updating said display of said perspective view of said three-dimensional digital model to correspond to said manipulated digital model; and
responding to any additional received signals at said processing means by further manipulating in said processing means and updating said perspective view of said three-dimensional digital model to correspond to said wheel alignment parameters and angular relationships indicated by said additional received signals.

* * * * *